A. TROWBRIDGE.
ODOMETER.
APPLICATION FILED JAN. 5, 1911.

1,002,011.

Patented Aug. 29, 1911.
2 SHEETS—SHEET 1.

Attest:
Edgeworth Greene
Ella J. Kruger

Inventor:
Amasa Trowbridge
by Redding, Greeley & Austin
Attys

A. TROWBRIDGE.
ODOMETER.
APPLICATION FILED JAN. 5, 1911.
1,002,011.
Patented Aug. 29, 1911.
2 SHEETS—SHEET 2.
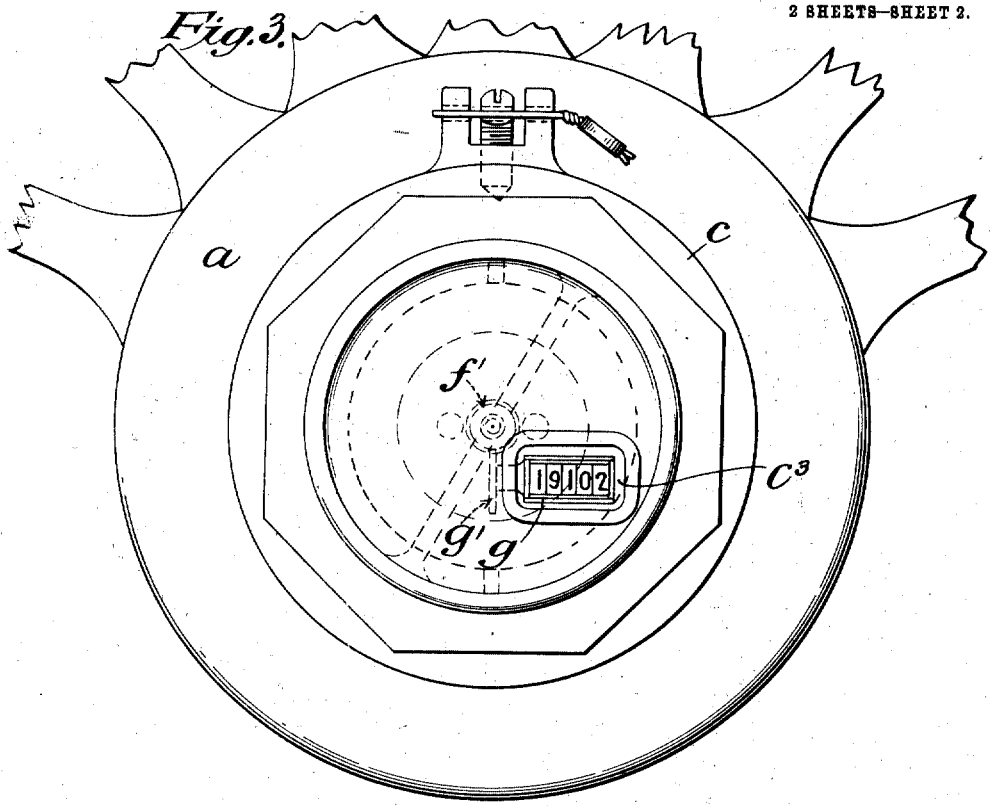
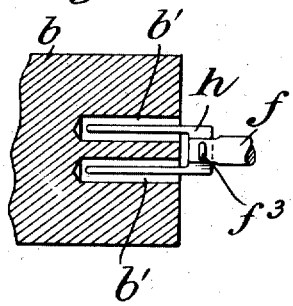
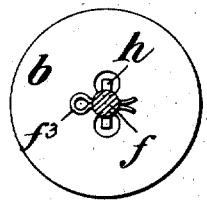
Attest:
Inventor:
Amasa Trowbridge
by Redding, Greeley & Austin
Attys.

UNITED STATES PATENT OFFICE.

AMASA TROWBRIDGE, OF HARTFORD, CONNECTICUT, ASSIGNOR TO THE VEEDER MANUFACTURING COMPANY, OF HARTFORD, CONNECTICUT, A CORPORATION OF CONNECTICUT.

ODOMETER.

1,002,011.  Specification of Letters Patent.  Patented Aug. 29, 1911.

Application filed January 5, 1911. Serial No. 600,973.

*To all whom it may concern:*

Be it known that I, AMASA TROWBRIDGE, a citizen of the United States, residing in the city of Hartford, in the State of Connecticut, have invented certain new and useful Improvements in Odometers, of which the following is a specification, reference being had to the accompanying drawings, forming a part hereof.

This invention relates to distance measuring devices such as are applied to the hubs of automobiles or other vehicles and are driven through a connection to the stationary axle, and it has for its object to improve the means for actuating the registering devices.

The invention will be more fully explained hereinafter with reference to the accompanying drawings in which it is illustrated and in which—

Figure 1:
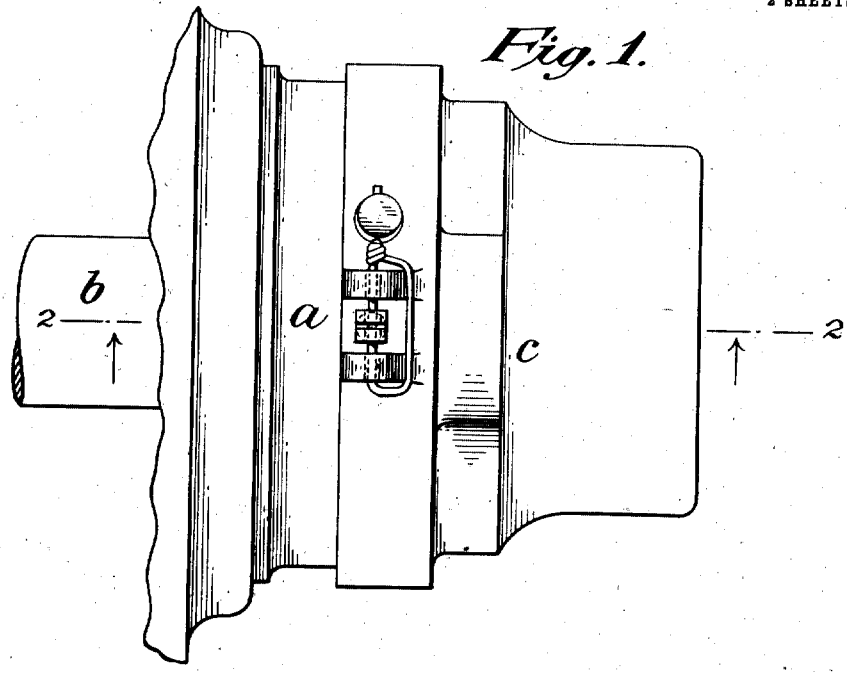
Figure 2:
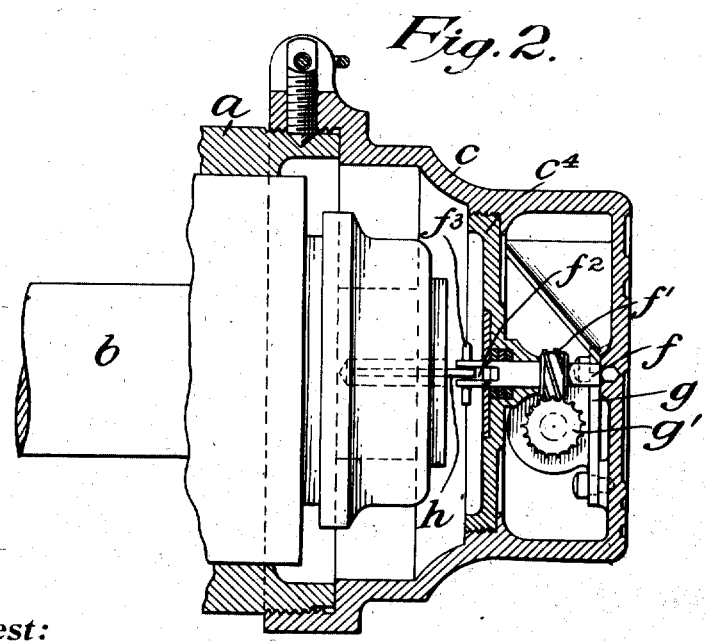

Figure 1 is a view in side elevation showing a portion of the hub of an automobile or other vehicle wheel equipped with the invention. Fig. 2 is a detail view in section on the plane indicated by the broken line 2—2 of Fig. 1. Fig. 3 is a view of the same in end elevation, and Figs. 4 and 5 are detail views showing a part of the preferred connection between the stationary axle and the recording device.

In the embodiment of the invention shown in the drawings, the hub $a$ of a vehicle wheel is shown as mounted, through suitable bearings, the details of which it is not necessary to represent, upon a stationary axle $b$, a portion of which is shown. Secured upon the outer end of the hub, so as to rotate therewith, is a cap $c$ which covers the end of the hub and axle and incloses the registering device with its connections. The cap may be secured upon the hub by any suitable means as by having a screw threaded engagement therewith, as indicated in Fig. 2.

The cap $c$ is provided at a suitable point with a glazed sight opening $c^3$ through which the reading of the registering device may be taken at any time and internally it is preferably provided, as clearly shown in Fig. 2, with a removable plate $c^4$ in which as well as in the head of the cap a spindle $f$ has its bearings, the spindle being axially alined with the stationary axle. On the spindle $f$ is secured a worm $f'$ which engages a worm wheel $g'$ on the shaft of the registering device $g$, which may be of any suitable character and suitably secured to the cap $c$ so as to rotate therewith. Thus, through the relative rotation of the cap $c$ and the spindle $f$ the recording device is actuated.

Since there is of necessity more or less relative displacement of the hub $a$ and therefore of the cap $c$ and spindle $f$ with respect to the stationary axle $b$, such relative displacement should be accommodated by the driving connections between the axle and the spindle, while provision must also be made for the convenient application of the driving connections to the stationary axle. For this reason, the end of the spindle $f$ is slotted, as shown at $f^2$ in Fig. 2, and has loosely connected thereto by a pin $f^3$ a driver $h$ which has a loose driving engagement with the stationary axle $b$. This loose driving engagement is most conveniently provided for by drilling in the end of the axle $b$ two holes $b'$ which are eccentric but parallel with the axis of the axle, and by making the driver $h$ forked or U-shaped so that each member may enter loosely one of the holes $b'$. This arrangement of the driving connections permits relative longitudinal displacement of the hub and stationary axle and also prevents binding should the axle and the spindle fail to be in exact axial alinement.

By the construction and arrangement of parts substantially as shown and described herein the counter or registering device is properly supported, is prevented from being tampered with by any unauthorized person and is driven without liability to injury either of the registering device or of the driving connections.

I claim as my invention:

1. The combination with an axle having parallel holes in the end thereof and a hub, of a cap secured to the hub, a registering device mounted on the cap to rotate therewith, and a loose driving connection between the registering device and the axle, the same comprising a forked driver engaging said parallel holes in the end of the axle and driving connections between the driver and the registering device.

2. The combination with an axle and a hub, of a cap secured to the axle, a registering device mounted on the cap to rotate therewith, and a loose driving connection between the registering device and the axle, the same comprising a spindle, driving connections between the spindle and the registering device and a driver loosely pivoted to the spindle and loosely engaging the axle permitting relative displacement of the axle and the registering device without loss of transmission.

This specification signed and witnessed this 28th day of December, 1910.

AMASA TROWBRIDGE.

Signed in the presence of—
EDWARD H. CROSBY,
CURTIS H. VEEDER.